Oct. 26, 1965   E. L. JAMES ETAL   3,214,117
EJECTION SEAT ARRANGEMENT
Filed Jan. 7, 1964   7 Sheets-Sheet 2

EDWARD L. JAMES
MICHAEL A. RICKARDS
WILLIAM J. SIEBER
INVENTORS.

BY Lyon & Lyon
ATTORNEYS

EDWARD L. JAMES
MICHAEL A. RICKARDS
WILLIAM J. SIEBER
INVENTORS.

BY Lyon & Lyon

ATTORNEYS

EDWARD L. JAMES
MICHAEL A. RICKARDS
WILLIAM J. SIEBER
INVENTORS.

BY *Lyon & Lyon*

ATTORNEYS

EDWARD L. JAMES
MICHAEL A. RICKARDS
WILLIAM J. SIEBER
INVENTORS.

BY *Lyon & Lyon*

ATTORNEYS

Oct. 26, 1965    E. L. JAMES ETAL    3,214,117
EJECTION SEAT ARRANGEMENT
Filed Jan. 7, 1964    7 Sheets-Sheet 7

EDWARD L. JAMES
MICHAEL A. RICKARDS
WILLIAM J. SIEBER
INVENTORS

BY Lyon & Lyon
ATTORNEYS

3,214,117
EJECTION SEAT ARRANGEMENT
Edward L. James and Michael A. Rickards, Sherman Oaks, and William J. Sieber, Northridge, Calif., assignors to Weber Aircraft Corporation, a corporation of California
Filed Jan. 7, 1964, Ser. No. 336,198
31 Claims. (Cl. 244—122)

This invention relates to an ejection seat to be occupied by a person for separating the person and seat from a vehicle of any type and, in particular, is directed to such an ejection seat arrangement incorporating numerous personnel safety protection features and which is of extremely lightweight construction for use in space vehicles.

The increased sophistication in flight vehicles in recent years and particularly those concerned with aerospace flight have produced previously unencountered requirements with regard to assuring the escape of the vehicle occupant. For example, one of the currently considered requirements is for causing the escape of an astronaut positioned in a vehicle atop a booster rocket threatening impending explosion wherein the astronaut must be safely and rapidly moved a substantial distance away from the rocket. Another example of a recent requirement of escape capabilities is from a vehicle on or near the ground and stopped or moving at a minimal velocity, sometimes known as "zero-zero" condition. Numerous other conditions involving high speeds and various altitudes may also be encountered and the escape system must also serve to provide a saft escape under any of such variety of conditions.

The broadly conventional approach to such escape systems in recent years has been to eject the occupied seat by means of substantial force such as a seat-mounted rocket and then a parachute opens to safely convey the person to the ground. Certain systems support the seat from the parachute and retain the person in the seat which has been found generally unacceptable or undesirable by reason of the person not being directly connected to the parachute. Other escape systems permit or accomplish separation of the seat from the person and the parachute is connected directly to the person. With regard to the zero-zero capability of an escape system, it is necessary to propel the seat and occupant to a sufficient height to permit safe opening of the parachute. With regard to the impending booster explosion situation, it is necessary to propel the seat and occupant a sufficient lateral distance for safety and height for opening of the parachute. Due to these large distances of necessary propulsion, it is generally conceded that for escape from very large boosters, an additional seat mounted rocket is required.

However, there are numerous problems encountered in propelling an occupied seat by means of a rocket. For example, if the departure, sometimes called "tip-off," of the seat from the vehicle causes a rolling or tumbling movement then the rocket will propel the seat in a curved path dependent on the rate of tumbling which could result in propelling the seat into the ground. Similarly if the force vector produced by the rocket is substantially displaced from the center of gravity of the occupied seat then the propelling force itself will produce a tumbling motion with the same possible results. It, therefore, has been somewhat conventional to direct the rocket discharged in a manner whereby the force vector intentionally does not pass through the center of gravity of the occupied seat, but rather it is slightly spaced therefrom in order to tend to induce a compensating tumbling motion in a direction opposite to the tumbling motion produced at the tip-off of the seat from the vehicle. Since the rocket is generally mounted on the back of the seat with a nozzle at the base and the center of gravity of the occupied seat is above and to the front, the rocket nozzle is usually positioned at an angle of 30°–50° relative to both the verticle back of the seat and the direction of first motion. Due to such nozzle angle and the other factors, the trajectory of the occupied seat is substantially difficult to control and this difficulty is compounded by the fact that the center of gravity of the occupant changes location by reason of force induced slump, thereby changing the center of gravity of the occupied seat system.

Moreover, it is highly desirable that the ejection seat be of minimum weight to reduce the overall weight of the vehicle particularly with respect to space vehicles, and yet it is essential that the seat be of sufficient strength to withstand crash conditions. Under such crash conditions it is highly desirable that the seat serve as an impact-attenuating structure for the protection and safety of the occupant.

Accordingly it is a principal object of this invention to provide an ejection seat arrangement of extremely lightweight having novel impact-absorbing means as a structural portion of the seat. A further object is to provide such an arrangement in combination with a novel seat cushion means wherein the impact-absorbing characteristics may be readily predetermined for accommodating a particular individual with respect to weight and physique. A still further object is to provide such a novel arrangement of seat and cushion wherein the center of gravity of the occupied seat may be adjusted to identical locations for different individuals.

Another object of this invention is to provide a novel ejection seat construction wherein weight is minimized, the propulsion rocket is more closely spaced in the rearward direction from the center of gravity of the occupied seat, and unique means are employed as a structural seat element and impact energy absorbing supporting means.

Still another object of this invention is to provide a novel ejection seat arrangement wherein cooperating guiding means on the seat and vehicle produce a guided ejection and release of the seat from the vehicle to prevent any moment of force tending to develop tumbling of the seat upon tip-off.

It is still another object of this invention to provide a novel ejection seat arrangement wherein the occupant is continually connected to the parachute and yet under high load conditions, by reason of high velocity, the opening force of the parachute is transmitted directly to the seat and the occupant is restrained in the seat for comfortably absorbing the forces therethrough during the period of high load. A still further object is to provide such an arrangement wherein the occupant is automatically released from the seat upon reduction of the load to a normal level to thereby be directly supported from the parachute with the seat similarly supported at a spaced location. Another object is to provide such an ejection seat arrangement wherein an elongatable member serves to absorb the high level shock load between the parachute and the seat. It is also an object of this invention that such ejection seat arrangement produce immediate separation of the seat and occupant upon opening of the parachute under conditions of minimal or zero velocity of the vehicle.

Other and more detailed objects and advantages of this invention will appear from the following description and the accompanying drawings, wherein.

Referring now in further detail to the drawings, the ejection seat, generally designated 10, of this invention is illustrated as oriented in an upright position whereby the occupant 11 is seated in the generally normal position. Likewise, for simplicity throughout the description when the reference is made to directions, those directions will be oriented in the same manner with the ejection seat 10 assumed to be in the upright position and the seat back substantially vertical. However, it is to be understood and it will readily appear to those skilled in the art that when using the ejection seat 10 of this invention with various vehicles the seat will be oriented at various angles to the vertical. As for example, in a space capsule vehicle where it is desired that the astronaut-occupant 11 be in a relatively prone position the back of the ejection seat 10 may be positioned at only a slight angle to the horizontal such as 8° or 9°.

The seat 10 is provided with a structural "back-bone" in the form of an inverted U frame 12 formed from a continuous member having a H or I shaped cross-section. The vertical portions of the U-frame 12 comprise a pair of laterally spaced and parallel T-shaped rails 13 formed by the rearwardmost portion of the frame cross-section. Substantially the entire U-frame 12 is machined at appropriate locations for minimizing cross-section and weight where less structural strength is required as may be seen by the narrower width of the vertical portions as compared to the curved portion of the frame 12 and by the lightening holes 14.

A continuous tubular frame, generally designated 15, has laterally spaced upright portions 16 tapered along their rearward side for connection to the front side of the vertical portions of frame 12 by any convenient means such as welding. Each upright portion 16 is tapered in the vertical direction to produce the narrowest cross-section at the upper end to thereby reduce the cross-section of the tube in relation to the reduction of required structural strength of the tube for progressively higher locations along the connection to the frame 12. The lower end of each upright portion 16 continues through a curved portion 17 into a forwardly extending side portion 18 which is in turn connected through a forward curved portion 19 to a leg portion 20. The two leg portions are integrally joined by a lateral portion 21 which also serves as a foot stirrup for the occupant's feet. A second tubular frame, generally designated 22, has side portions 23 extending forwardly and upwardly from the base of each of the vertical portions of frame 12 into contact with the bottom of side portions 18 of tubular frame 15. A connecting portion 24 of frame 22 extends downwardly and across from the points of contact with frame 15 to join the side portions 23. A tubular strut 25 is connected between the lateral portion 21 of frame 15 and the connecting portion 24 of frame 22 to complete the rigid tubular structure of the seat 10. A pair of gusset plates 26 conforming to the outline configuration of the side portions of the tubular frames 15 and 22 are mounted on the outwardly facing and inwardly facing sides of the tubular members and on both sides of the seat 10 by any convenient means such as welding 27 for further increasing the structural rigidity of the seat. The gusset plates 26 are also affixed to the adjacent vertical portions of the frame 12.

Figures 1, 15:
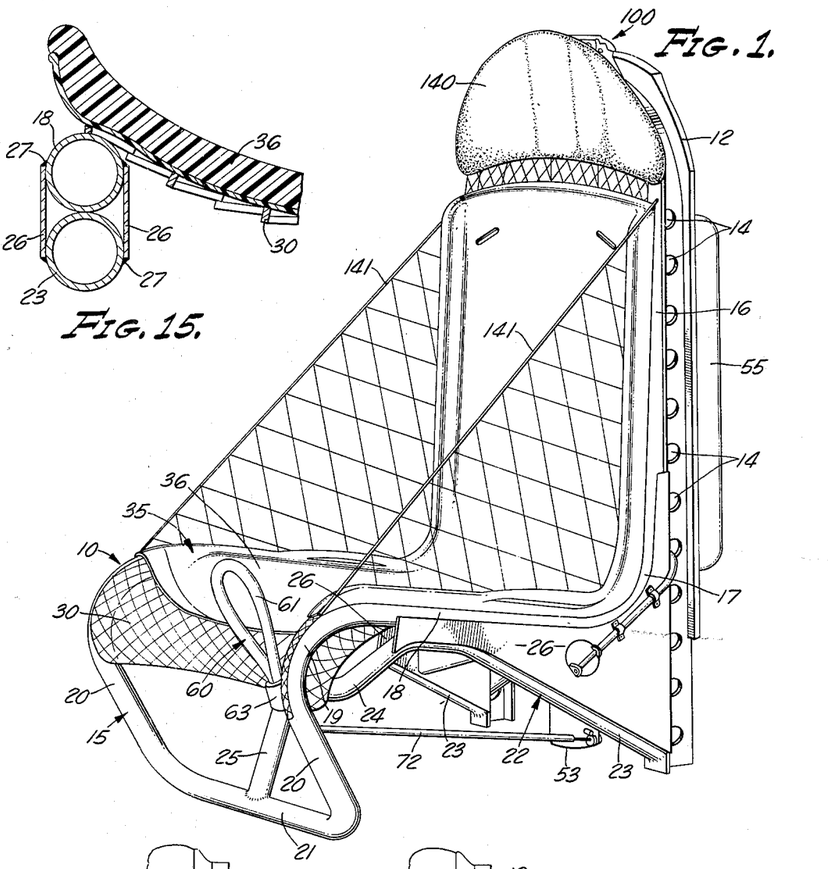
FIGURE 1 is a perspective view of the ejection seat of this invention with certain portions such as the lap belt and shoulder harness straps omitted for clarity.
FIGURE 15 is a fragmentary sectional elevation view taken substantially on the line 15—15 of FIGURE 2.
Figure 12:
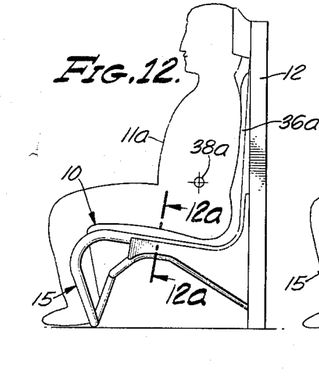
FIGURES 12 and 13 are schematic side elevations of the ejection seat of this invention with different size occupants for comparison purposes, with the occupant illustrated in FIGURE 12 being substantially heavier than the occupant illustrated in FIGURE 13.
Figures 12A, 13A:
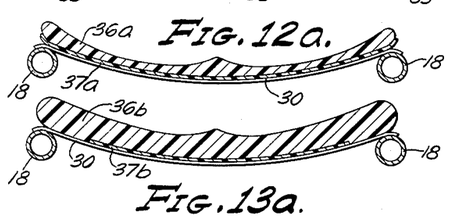
FIGURES 12a and 13a are fragmentary elevations of the seating portion of each of the seats taken substantially on the lines 12a—12a and 13a—13a of FIGURES 12 and 13, all respectively.

The basic structural assembly of the seat 10 is completed by the structural webbing 30 which also serves as the support surface for the occupant. The continuous webbing 30 extends across the tubular frame 15 and is connected between the curved portions 19, the side portions 18, the curved portions 17, and the upright portions 16 and continues thereabove and is connected to the upper portion of frame 12. The webbing 30 is appropriately curved for producing a seating contour as may be seen from FIGURES 12a, 13a and 15. The webbing 30 is rigidly secured to tubular frame 15 and frame 12 by any means convenient for the materials of webbing 30 and the frames. For maximum strength and minimum weight of the ejection seat the webbing 30 must function as a structural tension (and to some degree compression) member to further increase the rigidity of the seat and yet it is highly desirable that this supporting surface serve to absorb some of the impact encountered by the occupant 11 under crash conditions. A material that has been found uniquely suitable for accomplishing these functions is aluminum matting known as "expanded metal" when the matting is properly oriented for forming the webbing 30. As is well known expanded metal is comprised of flat sheet metal that has been intermittently and uniformly pierced along closely spaced lines with the discontinuity of adjacent lines being intermediately spaced from each other whereby the sheet is laterally expanded to form an open mesh. It is specifically contemplated by this invention to orient this expanded metal webbing 30 in a manner whereby the continuous ribbons of metal between the pierced lines extend in the generally vertical direction on the back of the seat 10 and continue as part of the same integral sheet in the generally forward direction on the generally horizontal portion of the seat 10. Moreover, it is specifically contemplated that an expanded metal be used which has the continuous ribbons of metal forming angles of approximately 45° with the general direction of extension of the ribbons. In this manner the webbing 30 increases the rigidity of the seat structure, produces the desired unyielding structural support strength and rigidity under normal force conditions, and yet accomplishes uniquely appropriate shock-absorbing yielding upon application of extreme forces such as encountered in a crash condition. For example, if it is assumed that a crash condition occurs with the seat and occupant landing in the upright position whereby the occupant is urged straight downwardly by the impact, the forces will tend to stretch the webbing 30 downwardly beyond its ultimate strength which will first cause shearing of the integral joints between the aforementioned continuous ribbons of metal, thereby leaving only the aggregate of the continuous ribbons for sustaining the applied shock load. Since the continuous ribbons of the expanded metal ribbing 30 extend in a vertical direction on the back of seat 10, the continued downward force under these crash conditions will then place these continuous ribbons in direct tension requiring much greater force to cause elongation. Thus, a unique impact energy absorption is obtained wherein the first yielding movement is result of shearing between adjacent continuous ribbons at a given crash load level and yet continued yielding can only be caused by continued application of such a load level and finally only by further increasing the load level to cause tension failure. In this assumed crash condition the webbing 30 at the base portion of the seat 10 will be stretched downwardly as a result of the yielding of the webbing.

Figure 13:
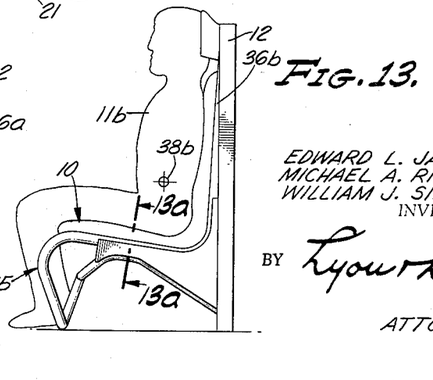
Figure 14:
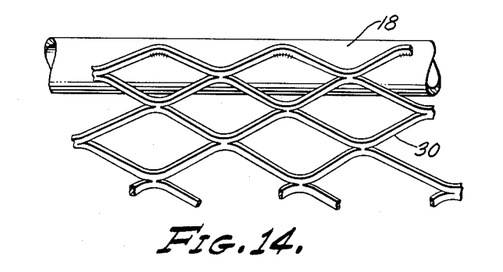
FIGURE 14 is a fragmentary perspective view of the structural support mat or web of the ejection seat as it is connected to one of the tubular side frame members.
Figure 16:
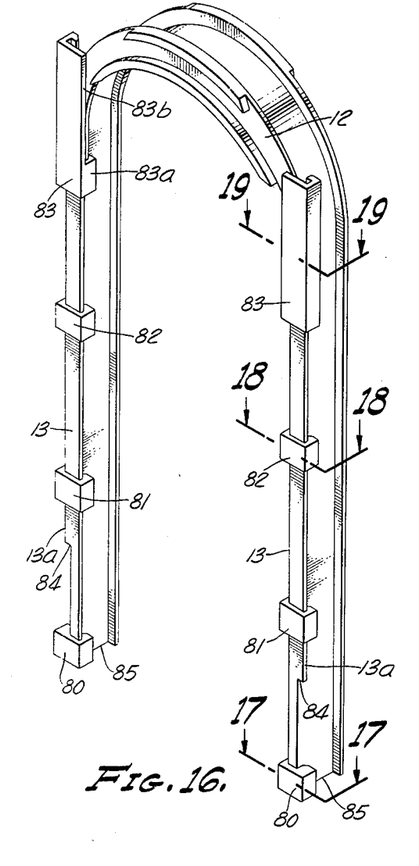
FIGURE 16 is a perspective view from the rear of the main structural frame of the ejection seat which forms the ejection guiding rail together with the vehicle-mounted blocks for guiding the ejection motion.
Figure 17:
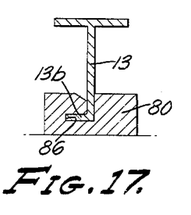
FIGURES 17, 18 and 19 are sectional plan views of the guide rail and guide blocks at various levels taken substantially on the lines 17—17, 18—18 and 19—19, respectively, of FIGURE 16.
Figure 18:
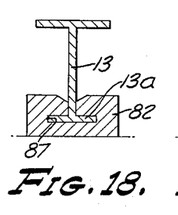
Figure 19:
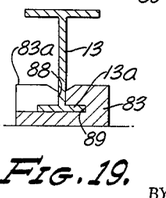

Means are provided for comfortably supporting and transmitting loads from the occupant 11 to the webbing 30 of the seat and, as shown in the drawings, these means may include a cushion assembly, generally designated 35. The assembly 35 is comprised of a cushion 36 contoured to comfortably support the occupant 11 and where conditions permit or require, as for space vehicles, the cushion 36 is contoured for the particular occupant 11. Cushion 36 is supported on a semi-rigid sheet element 37 contoured to fit the webbing 30. In this manner the cushion 36 serves to more evenly and comfortably transmit loads from the occupant 11 to the sheet element 37 and semi-rigid element 37 further distributes this load more evenly over the area of the webbing 30. As previously mentioned and as will appear more fully hereinafter, the location of the center of gravity of the combined seat 10 and occupant 11 is extremely critical in that a substantial displacement of such center of gravity from the line of vector force produced by the ejection-propelling rocket may cause disastrous tumbling of the occupied seat. Thus, it is proposed by this invention to not only contour the cushion 36 to fit the contour of the occupant 11, but to also vary the mean thickness of the cushion 36 for the particular occupant 11 to appropriately position the occupant's center of gravity with respect to the seat 10 whereby the resultant center of gravity of the occupant and seat is identically located with respect to the seat and particularly with respect to the rocket nozzle. Thus it may be seen from FIGURES 12 and 13 that this invention contemplates using a relatively thin cushion 36a with a relatively heavy occupant 11a as compared to a thick cushion 36b for a thin occupant 11b. In this manner the heavy occupant 11a is positioned closer to the frame 12 and to the floor than is the lighter occupant 11b. Thus the centers of gravity 38a and 38b for the combined occupant-seat is at the same relative location for the two different sized occupants.

Moreover, since the two occupants 11a and 11b are of different assumed weights, the given rate of acceleration or deceleration (as in a crash condition) will produce a resultant total force on the seat 10 by the occupant 11 proportional to the weight of the occupant. It is, of course, desired that the seat 10 be able to unyieldingly withstand normal forces of take-off, landing and ejection without regard for the weight of the occupant and yet it is also desired that the heretofore described shock-absorbing function of the webbing 30 be just as effective for protecting both light weight and heavy weight persons. Thus it is contemplated by this invention that the semi-rigid sheet element 37 be varied in surface area size and outline configuration for engaging an appropriate area of the webbing 30, whereby the supporting characteristics of the webbing 30 will be identical without regard for the weight of the occupant. Thus, for example, it may be seen in FIGURES 12a and 13a that the sheet element 37a for supporting the heavier occupant extends across the entire width of the webbing 30, whereas the sheet element 37b for supporting the lighter occupant 11b is of a width less than the width of webbing 30 to contact a smaller area of webbing 30. In this manner a given rate of upward acceleration of the seat will result in a large force on the cushion assembly 35 for a heavy occupant which is distributed over a large area of webbing 30 and will result in a smaller force on the cushion assembly 35 for a lighter occupant which is distributed over a smaller area of the webbing 30, thereby producing substantially equal forces per square inch on the webbing 30 tending to cause strain and yielding of the webbing. For example, it is necessary that the seat 10 and particularly the webbing 30 remain unyielding and rigid under normal loads including the G-loads encountered during ejection and yet under crash conditions of a predetermined G-level, such as 25–30 G's, it is necessary that the impact absorption yielding of webbing 30 occur for the protection of either a light or heavy occupant. The semi-rigid sheet element 37 serves the dual function of uniformly distributing the load from the occupant 11 to the webbing 30 and applying that uniform load to a preselected quantity and shape of area of the webbing 30 as a function of the individual occupant 11 to produce the desired impact-absorbing yielding of the mat.

A propulsion means of any convenient type, such as rocket 40, is mounted on the seat 10 for propelling the seat out of and away from the vehicle. A conventional rocket 40 usually combines two phases: a catapult or booster phase for accomplishing initial acceleration and ejection from the vehicle, and a sustainer phase as a continuing propulsion to drive the occupied seat away from the vehicle. The rocket 40 is mounted between the vertical portions of the U-shaped frame 12 and is symmetrically positioned in both the lateral and longitudinal directions with respect to the frame 12. The upper end of rocket 40 is provided with a conventional mounting bracket, generally designated 41, which fits between the downwardly extending flanges of upper portion of the frame 12 and bears against a block 42 mounted in the frame between those flanges. Thus, the upward thrust of the rocket is transmitted to the upper center portion of frame 12 which in turn transmits this force uniformly to the tubular frames 15 and 22 and thence to the occupant. A compression spring 43 extends between the bracket 41 and a mounting block 44 which is secured to the frame 12. In mounting the seat 10 in the vehicle with the rocket 40 in place, the compression spring 43 is compressed to exert a moderate force, say approximately 50 lbs. and the bracket 41 firmly contacts the block 42. As will hereinafter appear more fully, the rocket 40 is not firmly secured to the seat 10 and therefore when the rocket is completely spent the compression spring 43 will urge the rocket away from frame 12 thereby jettisoning the burned-out rocket. In this manner the occupant 11 is protected from sustained temperature increases if he remains in the seat 10 through choice or malfunction.

A support yoke assembly, generally designated 45, assists in transmitting the propulsion forces from the rocket 40 to the seat 10 and in supporting the rocket on the seat. Support yoke assembly 45 includes a half collar 46 for engaging the rocket 40, a pair of forwardly and outwardly extending tubular members 47 connected at one end to intercostal bearings 48, and a shield gusset 49. The intercostal bearings 48 are appropriately mounted in the flange plates 26 on each side of the seat 10 for pivotal movement about a horizontal lateral axis. The shield gusset 49 extends between the tubular members 47 and is secured thereto for forming a rigid assembly. The shield gusset 49 is provided with a lower deflecting surface 50 serving as a barrier between the occupied seat and the nozzle of the rocket to deflect burning particles that may otherwise present a hazard. A pair of struts 51 extends upwardly and outwardly from the half collar 46 and are joined to the frame 12. A pair of similar struts 52 extends downwardly and outwardly and are connected to the frame 12. Struts 51 and 52 serve to reinforce the support assembly 45 and prevent inadvertent pivotal movement thereof. However, struts 51 and 52 are of a strength for readily failing under crash conditions wherein the webbing 30 is elongated downwardly under the force of the occupant 11 and in this way upon contact the support assembly 45 pivots downwardly for continued unimpaired yielding of the webbing 30. The struts 51 fail in tension and the struts 52 fail under column loading. As previously noted, the nozzle of the rocket 40 positioned at the base 53 of the rocket will be directed in a rearward and downward direction whereby a forward and upward force will be applied to the seat 10. It may be seen that the upward force will be transmitted to the frame 12 at the upper end of the rocket and the forward thrust force will be transmitted to the seat by the support assembly 45. Since the rocket 40 is immediately behind the webbing 30 forming the back of the seat, the rocket nozzle is at a minimum longitudinal distance behind the center of gravity of the occupied seat, thereby minimizing the angular displacement of the nozzle from the vertical. This further minimizes the heretofore mentioned induced errors caused by the slump of the center of gravity of the occupant under ejection forces. Moreover, the parachute 55 is mounted on the back of the seat on one side of the rocket 40 and the conventionally supplied survival kit 56 is mounted on the back of the seat on the other side of rocket 40. Thus, the parachute and the survival kit are actually positioned to the rear of the center line of rocket 40 thereby further moving the center of gravity of the occupied seat in a rearward direction.

Figures 2, 3:
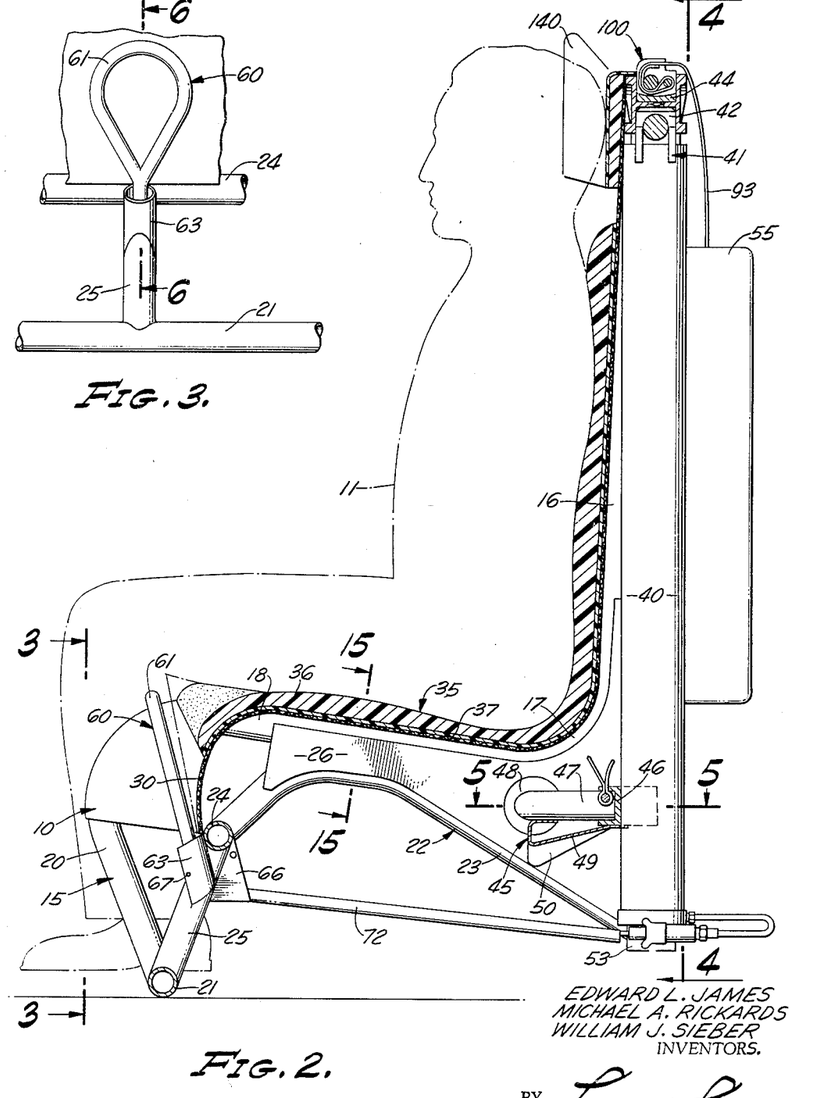
FIGURE 2 is a sectional side elevation view of the ejection seat taken immediately in front of the lateral center of the seat.
FIGURE 3 is a fragmentary front view of the ejection actuation mechanism for the seat taken substantially on the line 3—3 of FIGURE 2.
Figure 6:
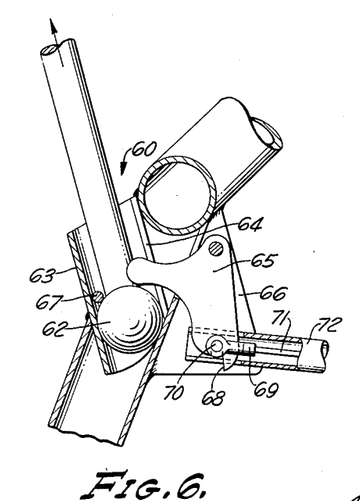
FIGURE 6 is a fragmentary sectional elevation taken substantially on the line 6—6 of FIGURE 3 and illustrating the ejection actuation mechanism.
Figure 7:
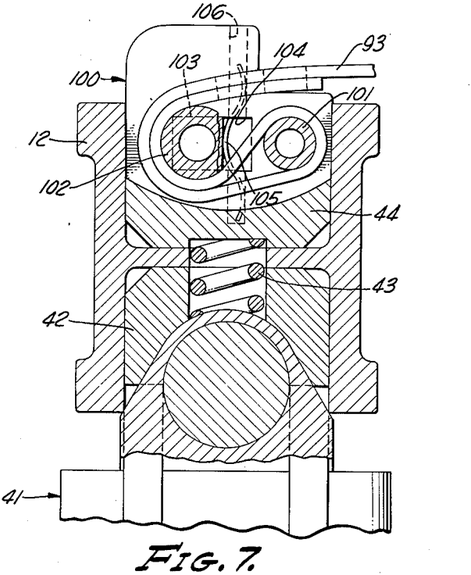
FIGURE 7 is a fragmentary sectional elevation taken substantially on the line 7—7 of FIGURE 4 and illustrating the snubber mechanism and rocket thrust connection.

Means are provided for initiating the ejection of the occupied seat 10 from the vehicle and these means may include the D-handle assembly, generally designated 60, mounted in the forward portion of the seat as best shown in FIGURES 3 and 6. A conveniently shaped handle 61 has a ball member 62 mounted on the lower end thereof which is positioned in a tubular member 63 mounted on the seat frame. A lever 65 is pivotally mounted on a bracket 66 on the tubular frame 22 and extends through a slot 64 in member 63 to a position above ball 62. A shear pin 67 is mounted in tubular member 63 above the ball 62. In order to initiate the ejection an upward force must be applied on handle 61 of sufficient magnitude to shear the pin 67 thereby permitting the ball to engage and pivot the lever 65. While ball 62 fits closely within tubular member 63, the handle 61 fits loosely within tubular member 63 thereby permitting the occupant 11 to pull upwardly on handle 61 in a range of directions with equal success. A second or locking pin (not shown) may be provided similar to shear pin 67 but of greater strength for preventing inadvertent actuation of the ejection mechanism by reason of a force applied to handle 61 of any magnitude. Such a locking pin would be removed after the occupant is positioned in the seat 10 and before flight. The lever 65 is provided with a downwardly extending slot 68 and a clevis member 69 fits over this portion of lever 65 and has a pin 70 engaging the slot 68. Clevis member 69 is connected to a cable 71 which extends rearwardly and is connected to the rocket ignition means and seat-locking means (not shown). The pivoting of lever 65 by lifting of handle 61 pulls cable 71 thereby releasing the seat 10 from the vehicle and igniting the rocket 40. A tube 72 surrounds the cable 71 for preventing inadvertent ignition of the rocket by snagging or pulling of the cable. Further, inadvertent actuation of the rocket under a crash condition is prevented by the slot and pin arrangement between lever 65 and clevis 69, whereby downward force on the tube 72 will merely cause the clevis 69 to be released from the lever 65. This frees the cable 71 and prevents actuation as might otherwise be caused by the downward movement of the occupant 11 through the yielding of the impact-absorbing webbing 30.

Figure 20:
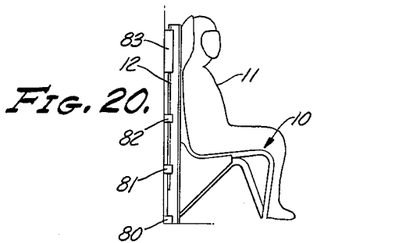
FIGURES 20, 21 and 22 are diagrammatic illustrations of the sequential movements of the ejection seat and occupant during ejection and through the moment of tip-off.
Figure 21:
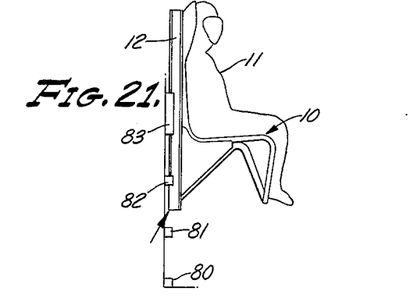
Figure 22:
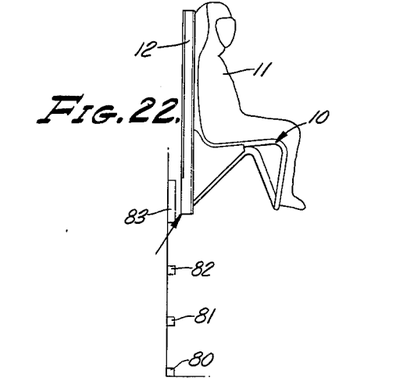

Means are provided for supporting the seat 10 within the vehicle and guiding the ejection motion of the seat 10 out of the vehicle and, as shown in the drawings, these means may include a plurality of pairs of guide blocks 80, 81, 82 and 83 mounted on the vehicle structure with one of each pair engaging each of the vertical rails 13 of the frame 12. The outwardly extending one-half 13a of the flange of each rail 13 terminates at point 84 at a preselected distance from the bottom 85 of the rail. Thus the lowermost guide block 80 is provided with only an inwardly extending L-shaped slot 86 for accommodating the inwardly extending one-half 13b of the flange of the rail 13. Each of the guide blocks 81 and 82 may be substantially the same and each is provided with a T-shaped slot 87 for slidably engaging the rail 13. Guide blocks 81 and 82 are vertically spaced from one another and from block 80 in the vertical direction to provide uniform support. Guide blocks 83 are of substantial vertical length and are positioned adjacent the upper extremity of the rails 13. Guide blocks 83 have a lower portion 83a with a T-shaped slot 88 and an upper portion 83b having an outwardly extending slot 89 for engaging only the outwardly extending half flanges 13a, the outer surface of the web of rail 13, and the rearwardly facing surface of rail 13. Thus, the inwardly facing portion of the upper portion 83b of each of the guide blocks 83 is unobstructed for accommodating the inwardly and upwardly curving portions of the frame 12. The upper portion 83b is of a vertical length substantially identical to the preselected distance between the termination point 84 of half flange 13a and the lower extremity 85 of the frame. In this manner, the catapulting movement of the seat 10 relative to the vehicle is guided by the guide blocks 80, 81, 82 and 83 from inception to the moment of tip-off. Just prior to tip-off the outer half flange 13a of each rail at the point 84 is still engaged in the slot 89 of the upper portion 83b of guide block 83, and the lower extremity of the inner half flange 13b of the rail is engaged in the T-slot 88 of the lower portion 83a of guide block 83. This interengagement of half flange 13a with slot 89 and half flange 13b with slot 88 terminates at precisely the same position of movement due to the predetermined cooperating lengths and thus the occupied seat 10 moves away from the vehicle in rectilinear motion and without a tumbling rotation being induced at the tip-off. In effect, the seat 10 is prevented from rotating by the guide blocks and particularly by guide blocks 83 until the precise instant of release and, in the final stages, the moment arm resisting this possible tumbling rotation is equal to that preselected distance between point 84 and the lower end 85 of the rail. This sequence of movement is clearly illustrated in FIGURES 20, 21 and 22. While a particular number of pairs of guide blocks have been illustrated and described, it is to be understood and will readily appear to those skilled in the art that more or fewer guide blocks of the appropriate configuration may be employed.

The parachute 55 is deployed when the occupied seat reaches the most advantageous point in the trajectory from the vehicle and this delayed parachute deployment may be accomplished in any conventional manner such as a time-delayed firing of a drogue chute gun with the time interval initiated by the first ejection movement of the seat. The parachute 55 is provided with the conventional pair of main risers 90 from the occupant's harness 91 to the lines 92 of the parachute. An auxiliary riser 93 is also connected to the lines 92 of the parachute in parallel with and at the upper ends of the risers 90.

Means are provided on the seat 10 for gripping the auxiliary riser 93 under preselected conditions to attach the deployed parachute directly to the seat rather than the occupant and, as shown in the drawings, these may include the snubber mechanism, generally designated 100. The mounting for snubber mechanism 100 may include the heretofore described block 44 mounted between the upwardly extending flanges of frame 12 at the top of the frame. Mounting block 44 has spaced walls forming an upwardly open and longitudinally extending slot wider than the auxiliary riser 93. A tubular bar 101 is securely mounted in block 44 near one longitudinal extremity of the slot. A second tubular bar 102 is mounted longitudinally adjacent and parallel to the fixed bar 101 and incorporates means for permitting movement toward and away from fixed bar 101. These means may include square or rectangular blocks 103 formed on each end of bar 102 for cooperating with rectangular slots 104 in the slot walls of mounting block 44. In this manner the bar 102 is permitted to move from a location substantially spaced from bar 101 to a location where the spacing between the bars is approximately the thickness of the auxiliary riser 93. Biasing means, such as a pair of leaf springs 105, mounted in grooves 106 of the block 44 and engaging the block portions 103 of the bar 102, are provided for urging the bar 102 in the direction away from fixed bar 101. The springs 105 urge the bar 102 with a force slightly in excess of the weight of the seat 10 and occupant 11 for reasons that will appear more fully hereinafter. The auxiliary riser 93 is looped around the fixed bar 101 and both sides of the loop pass over the outer side of movable bar 102. The end portion 93a of auxiliary riser 93 is loosely secured to that portion of the auxiliary riser extending toward the parachute by any convenient frangible means such as weak stitching 107. As thus connected, the auxiliary riser 93 is shorter than the main risers 90 and will be subjected to the parachute opening force. The auxiliary riser 93 functions as an energy-absorbing tension member and, therefore, may be of any convenient material that will elongate without failing under shock loads encountered upon deployment of the parachute.

Figure 8:
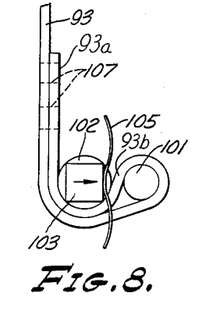
FIGURES 8, 9, 10 and 11 are schematic illustrations of the sequential operation of the snubber mechanism of this invention.
Figure 9:
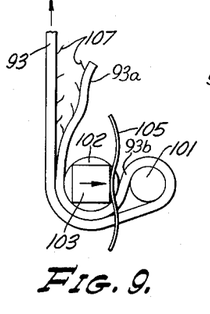
Figure 10:
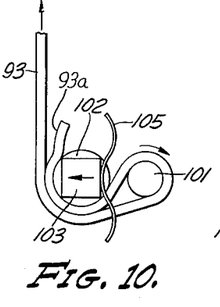
Figure 11:
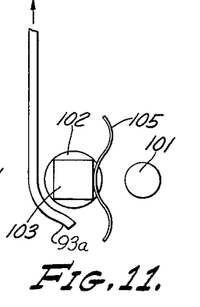
Figures 23, 24, 25:
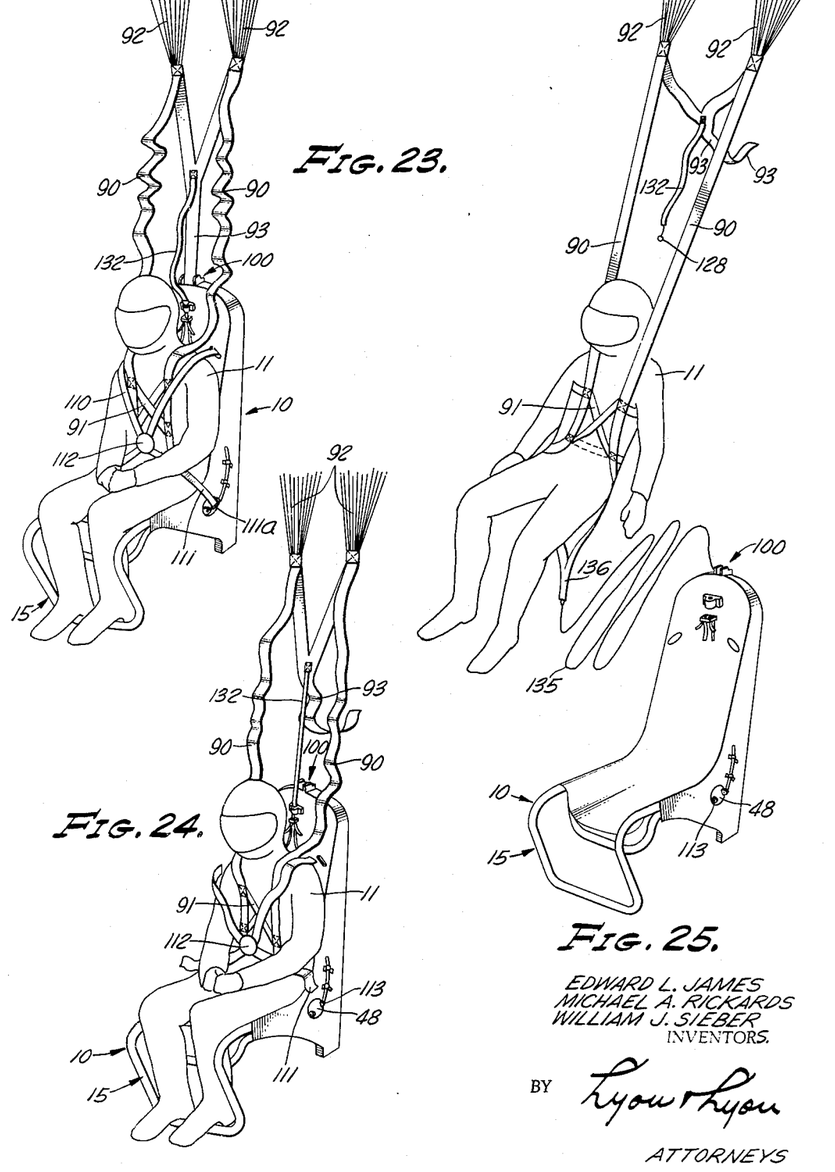
FIGURES 23, 24 and 25 are perspective illustrations of the sequential steps occurring between opening of the parachute and the condition for normal descent.

Referring specifically to the sequential schematic FIGURES 8–11, a condition is illustrated wherein the occupied seat is moving at a substantial velocity relative to the surrounding air when the parachute opens such as would occur upon ejection from a rapidly moving vehicle as contrasted with a zero-zero condition ejection or from a vehicle upon a booster on the launching pad. The first force of the opening parachute will be transmitted through auxiliary riser 93 to the snubber mechanism 100 as shown in FIGURE 23 and this tension force on auxiliary riser 93 will force the movable bar 102 toward the fixed bar 101 in opposition to the biasing force of springs 105 to pinch a portion 93b of the auxiliary riser between the two bars as shown in FIGURE 8. This serves to grip the auxiliary riser against further applied force and the tension on auxiliary riser 93 causes elongation thereof and failure of the stitching 107 as shown in FIGURE 9. As the deployed parachute decelerates the occupied seat 10 to a normal descent rate, the tension on auxiliary riser 93 is reduced to a level whereby the springs 105 urge the movable bar 102 away from the fixed bar 101 to release the pinched portion 93b of the auxiliary riser as shown in FIGURE 10. This continued moderate tension on auxiliary riser 93 causes the riser to "snake" the loop and end portion of the riser over and off the bars 101 and 102 as shown in FIGURE 11, and as approximately shown in FIGURE 24. Thus, the initial impact of opening of the parachute at high velocities is transmitted through the auxiliary riser 93 to the seat 10 where the occupant 11 is comfortably situated for withstanding such initial impact and moreover the auxiliary riser 93 is of an energy-absorbing material for substantially reducing this impact force transmitted to the seat. When the parachute is deployed at zero or low velocities of the occupied seat 10, the initial tension on auxiliary riser 93 will be insufficient to cause any substantial or sustained movement of bar 102 toward bar 101 and, therefore, the auxiliary riser will not be gripped by the snubber mechanism. However, this moderate tension force will be sufficient to cause failure of the frangible stitching 107 thereby permitting the auxiliary riser 93 to be immediately released from the snubber mechanism 100. Thus, under zero or low velocity conditions where the impact force on the occupant due to parachute deployment is insignificant, the auxiliary riser is immediately released from the seat and the parachute is directly coupled to the occupant 11 by the main risers 90. This also permits a rapid separation, as hereinafter described, of the seat from the occupant under these low velocity conditions where it is most advantageous to a safe descent of the occupant in the short time permitted.

Figures 4, 5:
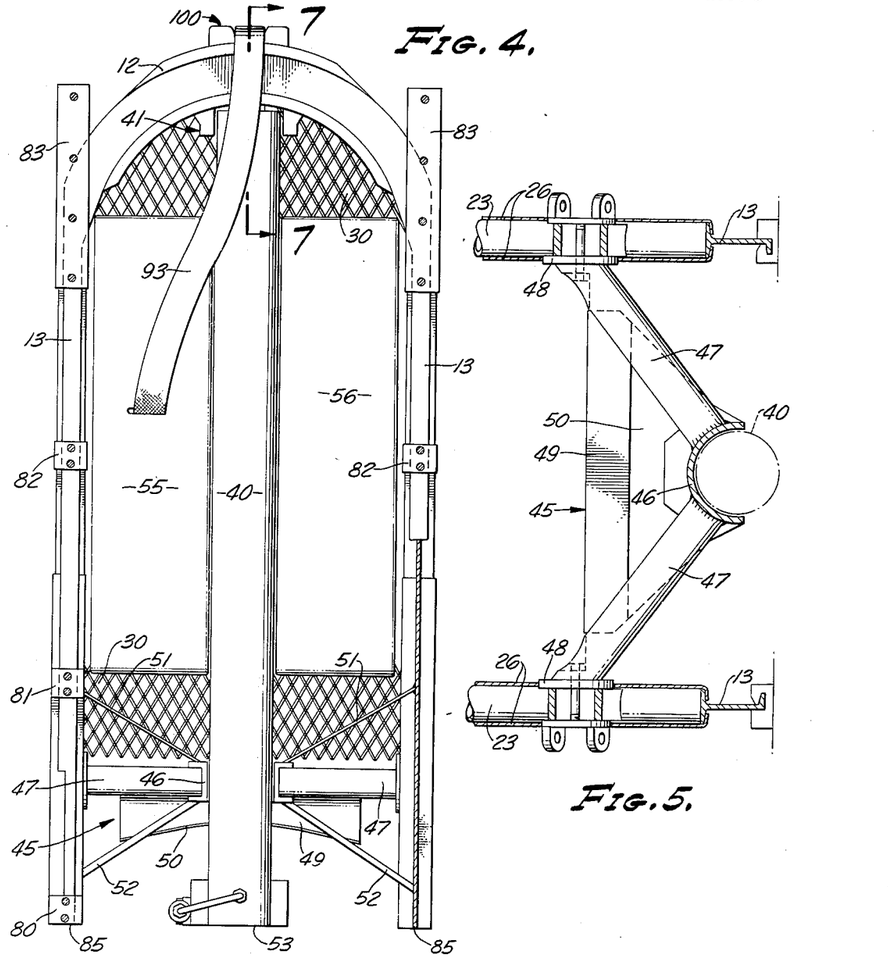
FIGURE 4 is a rear sectional elevation view taken substantially on the line 4—4 of FIGURE 2.
FIGURE 5 is a fragmentary sectional plan view taken substantially on the line 5—5 of FIGURE 2 and illustrating the rocket and lap belt support yoke.

Referring more particularly to FIGURES 23–29, the occupant 11 is secured to the seat 10 under normal flying conditions and in the early stages of ejection by shoulder harness straps 110 and a lap belt 111. A common clasp 112 may be used to lock the shoulder harness straps and the lap belt at the desired tightness. The shoulder harness straps 110 pass through slots in the back of the seat 10 and are joined to a downwardly extending strap 112a positioned behind the seat although for clarity such are not illustrated in certain other of the figures such as FIGURE 4. Downwardly extending strap 112a is connected to a conventional inertia reel (not shown) mounted on the back portion of the seat for permitting, as is conventional, slow forward movements of the occupant 11 by extending the shoulder straps 110 but preventing any quick forward movement of the occupant by locking the straps. Each end of the lap belt 111 is provided with a loop portion 111a which fits between a pair of outwardly extending brackets 113 provided on the outer side of each of the intercostal bearings 48. A pin 114 extends through each of the loop portions 111a and through appropriate holes in the brackets 113 to lock the lap belt 111 to the intercostal bearings 48 and hence to the seat 10.

Figures 26, 27, 28, 29:
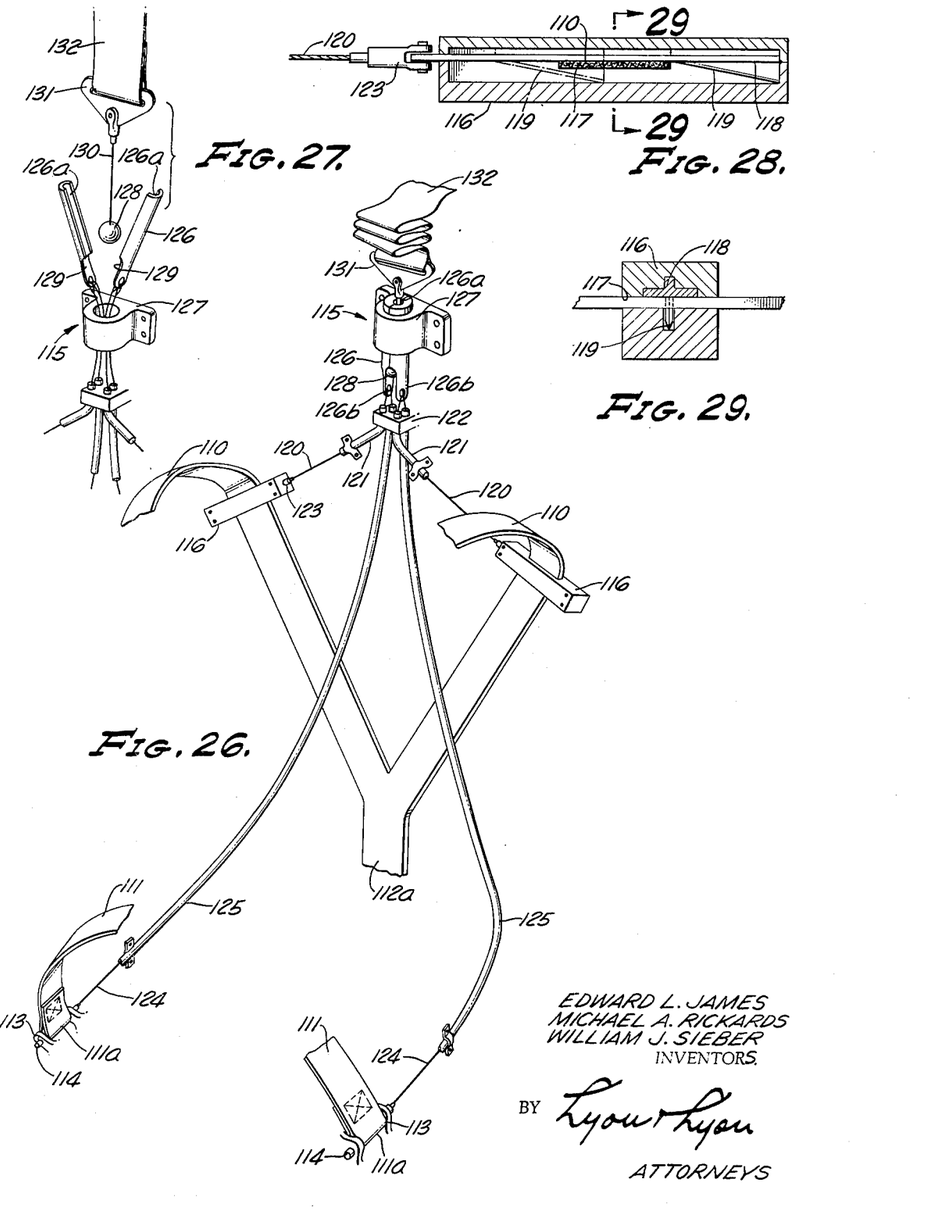
FIGURE 26 is a perspective illustration of the mechanism for releasing the lap belt and shoulder harness with the ejection seat omitted from the illustration for clarity. The components of this releasing mechanism have been omitted from many of the heretofore described figures for purposes of clarity of illustration of those figures.
FIGURE 27 is a perspective view of the final sequential step causing releasing of the lap belt and shoulder harness to separate the occupant and the seat.
FIGURE 28 is a longitudinal sectional view of the mechanism for releasing one of the shoulder harnesses.
FIGURE 29 is a sectional view thereof taken substantially on the line 29—29 of FIGURE 28.

Means are provided for rapidly releasing the occupant 11 from the seat 10 during the ejection sequence after deployment of the parachute and, as shown in the drawings, these means may include a harness strap release mechanism, generally designated 115. This release mechanism 115 includes a pair of shoulder strap cutters 116 each having a slot 117 therethrough for accommodating and allowing movement of the shoulder strap 110 therethrough. A knife blade member 118 having an inclined cutting edge 119 is slidably mounted in each cutter 116 near one end for movement from that end to the other end past slot 117 and through the location of shoulder strap 110 for severing the shoulder strap. A pair of flexible cables 120 extend through tubes 121 from a bracket 122 and are connected by clevis members 123 to each of the knife blade members 118, whereby appropriate tension on cables 120 will cause the severing of shoulders straps 110. A second pair of cables 124 extend through a pair of tubes 125 from the block 122 to the pins 114 which lock the lap belt 111 to the seat. Appropriate tension movement of cables 124 causes retraction of the pins 114 from the brackets 113 and loop portions 111a to release the lap belt 111 from the seat. Means are provided for causing the appropriate tension movement of cables 120 and 124 to release the shoulder straps 110 and lap belt 111 at the appropriate time and, as shown in the drawings, these means may include a split tube 126 slidably mounted in a guide 127 that is in turn mounted on the seat 10 and a cable suspended ball 128 positioned in an enlarged portion 129 of the split tube 126. The ball 128 is larger than the internal bore 126a of the split tube 126 and a cable 130 connects the ball 128 through the bore 126a of the split tube to a connector 131 which is in turn connected to a lanyard 132. The cables 120 and 124 are connected to the lower ends 126b of the two halves of the split tube 126. Upward tension on the lanyard 132 causes the split tube 126 to be pulled upwardly through the guide 127 to cause the tension movement of cables 120 and 124 needed to release the shoulder straps 110 and lap belt 111 from the seat. After the split tube 126 has passed completely through the guide 127, the two halves of the tube will separate to release the ball 128 therefrom and thereby free the lanyard 132, as shown in FIGURE 27. The lanyard 132 is attached to the auxiliary riser 93 at an appropriate location and is of an appropriate length whereby the lanyard 132 is slack throughout the energy-absorbing tensioning of the auxiliary riser 93, as shown in FIGURE 23, and until auxiliary riser 93 is released from the snubber mechanism 100. Further, the lanyard 132 is of such a length that tension will be applied thereto, as shown in FIGURE 24, after release of auxiliary riser 93 and before the main risers 90 from the parachute to the occupant are tensioned, thereby releasing the occupant 11 from the seat 10. With the occupant 11 released from the seat 10 and the ball 128 and lanyard 132 released from the split tube 126 of the release mechanism 115, the seat 10 is free to drop away from the parachute and occupant 11, as shown in FIGURE 25. A line 135 of substantial length, such as 25 feet, is connected between the seat 10 and a yoke strap 136 connected to the occupant harness 91 of the parachute, whereby the seat 10 is suspended below the occupant to stabilize the parachute descent and facilitate location after landing of the survival kit 56 attached to the seat. The seat 10, of course, will generally be provided with a cushioned headrest 140 and may be provided with restraining nets 141 on each side for preventing inadvertent arm flailing of the occupant during the ejection procedure. Further, any conventional means may be provided for erecting such nets 141 from a collapsed condition during the initial stages of ejection.

Thus, it may be seen that the ejection apparatus, procedure and sequence of the seat arrangement of this invenion provides the utmost protection and safety for the occupant with minimum weight and chances of malfunction. The parachute risers are continually connected through a harness to the occupant and yet the parachute is mounted in the unobstructing location behind the seat. The snubber mechanism causes the initial parachute deployment impact to be transmitted through the seat to the occupant under high velocity conditions only and the release mechanism permits parachute descent by the occupant separate from the seat as is often found more acceptable.

Having fully described our invention it is to be understood that we do not wish to be limited to the details herein set forth or to the details illustrated in the drawings, but our invention is of the full scope of the appended claims.

We claim:

1. In an ejection seat, the combination of: a frame having spaced side members and a rigid structural webbing means extending between and connected to said side members for forming an occupant-supporting area, said webbing means comprising elements for progressive energy-absorbing yielding of said webbing means upon preselected extreme relative acceleration forces between the occupant and seat and progressively increasing resistance to continued yielding under such preselected forces.

2. The combination of claim 1 wherein said elements of said webbing means yield to failure in one manner for said progressive energy absorption for imposing said forces thereon and in a different manner more readily resisted by said elements for said progressively increasing resistance to continued yielding.

3. In an ejection seat, the combination of: a frame having spaced side members, and a rigid structural webbing means of expanded metal extending between and joined to said side members of the frame to form an occupant-supporting area, said expanded metal webbing means having ribbons of continuous metal each integrally joined to adjacent ribbons at staggered locations to form an open mesh for progressive energy-absorbing yielding of said webbing means by initial shearing at said integral junctions and then tension elongation of said ribbons upon extreme relative acceleration forces between the occupant and seat.

4. The combination of claim 3 wherein said expanded metal webbing means is oriented with said continuous ribbons extending in the direction generally parallel to said side members.

5. The combination of claim 4 wherein the said continuous ribbons of said expanded metal webbing means form approximately a 45° angle with the general direction of extension of said ribbons at each said integral junction for increasing the structural rigidity of the seat.

6. In an ejection seat, the combination of: a frame having spaced side members, a rigid structural webbing means extending between and joined to said side members of the frame to form an occupant-supporting area, and a semi-rigid sheet element contoured and sized to engage said webbing means for supporting an occupant thereon and distributing forces between the occupant and the webbing means, said webbing means comprising means for causing progressive energy-absorbing yielding of said webbing means and progressive displacement of the occupant upon preselected extreme relative acceleration forces between the occupant and the seat.

7. In an ejection seat, the combination of: a frame having spaced side members, a rigid structural webbing means extending between and joined to said side members of the frame to form an occupant-supporting area, and a semi-rigid sheet element contoured and sized to engage said webbing means over a predetermined portion and magnitude of said supporting area generally proportional to the weight of and depending on the particular occupant for causing energy-absorbing yielding of said webbing means upon preselected extreme relative acceleration forces between that occupant and the seat.

8. In an ejection seat, the combination of: a frame having spaced side members, a rigid structural webbing means extending between and joined to said side members of the frame to form an occupant-supporting area, a cushion means positioned on said webbing means for transferring forces between the occupant and said webbing means and having a contoured support cushion for the occupant and semi-rigid sheet element backing for said support cushion, and said sheet element contoured and sized to engage said webbing means over a predetermined magnitude of said supporting area generally proportional to the weight of the particular occupant for causing energy-absorbing yielding of said webbing means upon preselected extreme relative acceleration forces between that occupant and the seat.

9. In an ejection seat, the combination of: a frame having spaced side members, a rigid structural webbing means extending between and joined to said side members of the frame to form an occupant-supporting area, a cushion means positioned on said webbing means for transferring forces between the occupant and said webbing means and having a contoured support cushion for a particular occupant, and a semi-rigid sheet element backing for said support cushion, said contoured support cushion having a shape and mean thickness for properly positioning that occupant's center of gravity to locate the center of gravity of the occupied seat at a preselected point relative to said frame, and said semi-rigid sheet element contoured and sized to engage said webbing means for causing energy-absorbing yielding of said webbing means upon substantial relative acceleration forces between the person and the seat.

10. In an ejection seat for an occupant, the combination of: an inverted U-shaped back frame having a generally continuous I-beam cross-section, a tubular frame having laterally spaced side members joined to and along said back frame and extending forward and then downward and together as an integral unit, a structurally rigid webbing means extending between and joined to said side members of the tubular frame to form a supporting area, a cushion means positioned on said webbing means for transferring forces between the occupant and said webbing means, and said cushion means having a semi-rigid sheet element contoured and sized to engage said webbing means over a predetermined portion and magnitude of said supporting area generally proportional to the weight of the particular occupant for causing energy-absorbing yielding of said webbing means upon preselected extreme relative acceleration forces between the person and seat.

11. In an ejection seat for an occupant, the combination of: an inverted U-shaped back frame having a generally continuous I-beam cross-section, said back frame having thinned vertical portions spaced the width of the seat and a heavy curved upper section, a rocket mounted between said back frame having vertical portions and engaging said upper section for transmitting thrust to said upper section, a tubular frame having laterally spaced side members joined to and along said back frame and extending forward and then downward and together as an integral unit, a structurally rigid webbing means extending between and joined to said side members of the tubular frame to form a supporting area, a cushion means positioned on said webbing means for transferring forces between the occupant and said webbing means, and said cushion means having a semi-rigid sheet element contoured and sized to engage said webbing means over a predetermined portion and magnitude of said supporting area generally proportional to the weight of the particular occupant for causing energy-absorbing yielding of said webbing means upon preselected extreme relative acceleration forces between the person and seat.

12. The combination of claim 11 wherein biasing means are mounted and compressed between said rocket and said upper section of the back frame for jettisoning said rocket upon termination of the thrust.

13. In an ejection seat arrangement for use by a person in rapidly departing from a vehicle, the combination of: a seat structure having an inverted U-shaped back frame and means for supporting the person in a seated position including a rigid webbing means forming a supporting area, a semi-rigid sheet element contoured and sized to engage said webbing means for supporting the person thereon and distributing forces between the person and said webbing means, said back frame having a pair of laterally spaced vertical rails, each said rail having a modified portion at the lower end of a predetermined length with part of the rail removed and another part remaining, guide block means for mounting on the vehicle and having means for slidably engaging said rails to guide vertical movement of said seat structure, a release guide block engaging each rail above said guide block means and mounted on the vehicle, and each release guide block having a lower portion for engaging the entire rail and an upper portion equal to said predetermined length, said upper portion of each release guide block having means for engaging only that said remaining part of the lower end of the rail for releasing the lower portions of the rails by said release guide blocks at two vertically spaced locations simultaneously upon vertical movement of the seat structure relative to the vehicle.

14. In an ejection seat arrangement for use by an occupant in rapidly departing from a vehicle, the combination of: a seat structure having an inverted U-shaped back frame, a tubular frame having laterally spaced side members joined to and along said back frame and extending forward and then downward and together as an integral unit, a structurally rigid webbing means extending between and joined to said side members of the tubular frame to form a supporting area, a cushion means positioned on said webbing means for transferring forces between the occupant and said webbing means, said cushion means having a semi-rigid sheet element contoured and sized to engage said webbing means over a predetermined portion and magnitude of said supporting area generally proportional to the weight of the particular occupant for causing energy-absorbing yielding of said webbing means upon preselected relative acceleration forces between the person and seat, said U-shaped back frame having a pair of laterally spaced vertical rails at the rear, each said rail having a modified portion at the lower end of a predetermined length with part of the rail removed and another part remaining, guide block means for mounting on the vehicle and having means for slidably engaging said rails to guide vertical movement of said seat structure, a release guide block engaging each rail above said guide block means and mounted on the vehicle, and each release guide block having a lower portion for engaging the entire rail and an upper portion equal to said predetermined length, said upper portion of each release guide block having means for engaging only that said remaining part of the lower end of the rail for releasing the lower portions of the rails by said release guide blocks at two vertically spaced locations simultaneously upon vertical movement of the seat structure relative to the vehicle.

15. In an ejection seat arrangement for use by a person in rapidly departing from a vehicle, the combination of: a seat structure having means for supporting the person in a seated position, said seat structure having a pair of laterally spaced vertical rails on the back, each said rail having a modified portion removed at the lower end of a predetermined length with part of the rail removed and another part remaining, guide block means for mounting on the vehicle and having means for slidably engaging said rails to guide vertical movement of said seat structure, a release guide block engaging each rail above said guide block means and mounted on the vehicle, and each release guide block having a lower portion for engaging the entire rail and an upper portion equal to said predetermined length, said upper portion of each release guide block having means for engaging only that said remaining part of the lower end of the rail for releasing the lower portions of the rails by said release guide blocks at two vertically spaced locations simultaneously upon vertical movement of the seat structure relative to the vehicle.

16. In an ejection seat arrangement for use by a person in rapidly departing from a vehicle, the combination of: a seat structure having means for supporting the person, said seat structure having a pair of laterally spaced vertical rails on the back, said rails each having a generally T-shaped cross-sectional portion, one-half of the flange of each said rail continuing downwardly at the lower end of said rails a predetermined length beyond the termination of the other one-half of the flange, guide block means for mounting on the vehicle and having T-slot means for slidably engaging said rails to guide vertical movement of said seat structure, a release guide block engaging each rail above said guide block means and mounted on the vehicle, and each release guide block having a lower portion with a T-slot for engaging both halves of the rail flange and an upper portion extending upward therefrom a distance equal to said predetermined length, said upper portion of each release guide block having means for engaging only the said other one-half of the rail flange for releasing the lower extremity of the said other one-half of the flange upon vertical movement of the seat structure relative to the vehicle at the same moment as the release of the longer one-half of the rail flange from the T-slot of the said lower portion of the release guide block.

17. In an ejection seat arrangement for use by a person in rapidly departing from a vehicle, the combination of: a seat structure having means for supporting the person, said seat structure having a pair of laterally spaced vertical rails on the back, said rails each having a generally T-shaped cross-sectional portion at the rear oriented with the upper flange of the T having one-half extending inwardly toward the other rail and the other half extending outwardly, said inwardly extending one-half of the flange of each said rail continuing downwardly at the lower end of said rails a predetermined length beyond the termination of each said outwardly extending half of the flange, guide block means for mounting on the vehicle and having T-slot means for slidably engaging said T-shaped portion of said rails to guide vertical movement of said seat structure, a release guide block engaging each rail above said guide block means and mounted on the vehicle, and each release guide block having a lower portion with a T-slot for engaging both halves of the rail flange and an upper portion extending upward therefrom a distance equal to said predetermined length, said upper portion of each release guide block having an inwardly facing slot for engaging only the outwardly extending half of the rail flange for releasing the lower extremity of the outwardly extending half of the flange upon vertical movement of the seat structure relative to the vehicle at the same moment as the release of the inwardly extending half of the rail flange from the T-slot of the said lower portion of the release guide block.

18. In an ejection seat arrangement for use by a person in rapidly departing from a vehicle, the combination of: a seat structure having means for supporting the person, and an inverted U-shaped back frame with a relatively continuous I-beam cross-section, said back frame comprising a pair of laterally spaced vertical rails on the back of the seat, said rails each having a generally T-shaped cross-sectional portion at the rear of a portion of the I-beam cross-section and oriented with the upper flange of the T having one-half extending inwardly toward the other rail and the other half extending outwardly, said inwardly extending one half of the flange of each said rail continuing downwardly at the lower end of said rails a predetermined length beyond the termination of each said outwardly extending half of the flange, guide block means for mounting on the vehicle and having T-slot means for slidably engaging said T-shaped portion of said rails to guide vertical movement of said seat structure, a release guide block engaging each rail above said guide block means and mounted on the vehicle, and each release guide block having a lower portion with a T-slot for engaging both halves of the rail flange and an upper portion extending upward therefrom a distance equal to said predetermined length, said upper portion of each release guide block having an inwardly facing open portion for accommodating the curved upper end of the back frame and an inwardly facing slot for engaging only the outwardly extending half of the rail flange for releasing the lower extremity of the outwardly extending half of the flange upon vertical movement of the seat structure relative to the vehicle at the same moment as the release of the inwardly extending half of the rail flange from the T-slot of the said lower portion of the release guide block.

19. In an ejection seat arrangement for an occupant, the combination of: a seat structure having a U-shaped back frame, a tubular frame having laterally spaced side members connected to said back frame, a structurally rigid webbing means extending between and joined to said side members of the tubular frame to form a supporting area, a cushion means positioned on said webbing means for transferring forces between the occupant and said webbing means, said cushion means having a semi-rigid sheet element contoured and sized to engage said webbing means over a predetermined portion and magnitude of said supporting area generally proportional to the weight of the particular occupant for causing energy-absorbing yielding of said webbing means upon preselected relative acceleration forces between the person and seat, harness means attached to said seat structure for securing the occupant to said cushion means and seat, a parachute positioned on the occupied seat and having main risers for connection to the occupant and an auxiliary riser, said main risers and said auxiliary riser being of relative length for the parachute to tension said auxiliary riser with said main risers slack, snubber means mounted on said seat structure for engaging and gripping said auxiliary riser upon application of loads above a preselected load level and to release said auxiliary riser upon lower loads, said preselected load level being less than the continuing load of supporting said person and seat structure from said parachute, and means for releasing said harness means after release of said auxiliary riser from the snubber means and before tensioning of said main risers for releasing the occupant from the seat.

20. In an ejection seat arrangement for an occupant, the combination of: a seat structure having means for supporting the occupant, harness means attached to said seat structure for securing the occupant to said supporting means, a parachute positioned on the occupied seat and having main risers for connection to the occupant and an auxiliary riser, said main risers and said auxiliary riser being of relative length for the parachute to tension said auxiliary riser with said main risers slack, snubber means mounted on said seat structure for engaging and gripping said auxiliary riser upon application of loads above a preselected load level and to release said auxiliary riser upon lower loads, and means for releasing said harness means after release of said auxiliary riser from the snubber means and before tensioning of said main risers for releasing the occupant from the seat.

21. The combination of claim 20 wherein said auxiliary riser is of a non-failing and elongatable material for absorbing the impact load of the parachute opening at high velocities of said occupied seat.

22. In an ejection seat arrangement for an occupant, the combination of: a seat structure having means for supporting the occupant, harness means attached to said seat structure for securing the occupant to said supporting means, means for ejecting the occupied seat from a vehicle, a parachute positioned on the occupied seat and having main risers for connection to the occupant and an auxiliary riser, means for deploying the parachute, a snubber mechanism mounted on said seat structure and having means engaging said auxiliary riser, said main risers and said auxiliary riser being of relative length for connecting the parachute to said snubber mechanism by said auxiliary riser with said main risers slack, said snubber mechanism having means for gripping said auxiliary riser upon impact loads of parachute deployment above a preselected load level and to release said auxiliary riser upon lower loads, said preselected load level being less than the continuing load of supporting the occupant and seat structure from said parachute, and means for releasing said harness means after release of said auxiliary riser from the snubber mechanism and before tensioning of said main risers for releasing the occupant from the seat.

23. In an ejection seat arrangement for an occupant, the combination of: a seat structure having means for supporting the occupant, harness means attached to said seat structure for securing the occupant to said supporting means, a parachute positioned on the occupied seat and having main risers for connection to the person and an auxiliary riser, means for ejecting the occupied seat from a vehicle and deploying said parachute, a snubber mechanism mounted on said seat structure and having means engaging said auxiliary riser, said main risers and said auxiliary riser being of relative length for closely connecting the parachute to said snubber mechanism by said auxiliary riser with said main risers slack, said snubber mechanism having means for gripping said auxiliary riser upon loads of parachute deployment above a preselected load level and to release said auxiliary riser upon lesser loads, said preselected load level being less than the continuing load of supporting the occupant and seat structure from said parachute, a lanyard connected to said parachute, and release means connected to said lanyard for releasing said harness means upon application of tension to said lanyard to release the occupant from the seat structure, said lanyard of a length relative to said main risers and auxiliary riser for being tensioned after release of said auxiliary riser from the snubber mechanism and before tensioning of said main risers.

24. In an ejection seat arrangement for an occupant, the combination of: a seat structure having means for supporting the occupant, harness means attached to said seat structure for securing the occupant to said supporting means, a parachute positioned on the rear of said seat structure and having main risers for connection to the person and an auxiliary riser, said main risers and said auxiliary riser being of relative length for closely connecting the parachute to said seat structure by said auxiliary riser with said main risers slack, a snubber mechanism mounted on said seat structure and having means for cooperating with said auxiliary riser to grip said auxiliary riser upon tension loads above a preselected load level and to release said auxiliary riser upon lesser loads, said snubber mechanism including a fixed bar and a parallel movable bar, means biasing said movable bar away from said fixed bar with a predetermined force, said auxiliary riser having an end portion looped around said fixed bar and around the outside of said movable bar, frangible stitching connecting that end portion to the auxiliary riser for tension on said auxiliary riser to destroy said stitching and tension loads above said preselected load level to urge said movable bar into position for pinching said auxiliary riser against said fixed bar to accomplish said gripping thereof, said preselected load level being less than the continuing load of supporting said occupant and seat structure from said parachute, and means for releasing said harness means after release of said auxiliary riser from the snubber mechanism and before tensioning of said main risers for releasing the occupant from the seat.

25. The combination of claim 24 wherein the said predetermined force with which said biasing means of the snubber mechanism urges the movable bar away from the fixed bar is substantially equal to said preselected load lever.

26. In an ejection seat arrangement for an occupant, the combination of: a seat structure having means for supporting the occupant, lap belt means and shoulder harness means attached to said seat structure for securing the occupant to said supporting means, a parachute positioned on the rear of said seat structure and having main risers for connection to the occupant and an auxiliary riser, a snubber mechanism mounted on said seat structure and having means engaging said auxiliary riser, said main risers and said auxiliary riser being of relative length for closely connecting the parachute to said snubber mechanism by said auxiliary riser with said main risers slack, said snubber mechanism having means for gripping said auxiliary riser upon application of parachute opening tensions loads above a preselected load level and to release said auxiliary riser upon lower loads, said preselected load level being less than the continuing load of supporting the occupant and seat structure from said parachute, pin means coupling said lap belt means to the seat structure, a severing mechanism associated with said shoulder harness means for releasing said shoulder harness means from said seat structure, cable means connected to said pin means and said severing mechanism for tensioning to uncouple said pin means and to actuate said severing mechanism, and a lanyard connected to said parachute and having means connected to said cable means for tensioning thereof to release said lap belt and shoulder harness means upon application of tension to said lanyard to release the occupant from the seat structure, said lanyard being of a length relative to said main risers and auxiliary riser for being tensioned after release of said auxiliary riser from the snubber mechanism and before tensioning of said main risers.

27. The combination of claim 26 in which a line of an appropriate length connects said seat structure to said parachute through said main risers for suspending the seat a substantial distance below the occupant after said separation between the seat and occupant.

28. The combination of claim 26 wherein said means connecting said lanyard to said cable means has means for releasing said lanyard from said cable means after full actuation of said cable means for freeing the seat structure from the lanyard.

29. The combination of claim 28 wherein said releasing means includes a slidably mounted split tube connected to said cable means and a ball suspended from said lanyard with said ball engaging a remote portion of said split tube for tension on said lanyard through said ball to cause sliding movement of said split tube and finally release of said split tube from said mounting for separating of said split tube to release said ball.

30. The combination of claim 22 in which said seat structure includes a tubular frame and an inverted U-shaped back frame of a relatively continuous I-beam cross-section connected to said tubular frame, and said snubber mechanism is mounted at the curved upper portion of said back frame for transmitting the parachute deployment impact to the entire seat structure.

31. In an ejection seat, the combination of: a frame having spaced side members, a rigid structural webbing means of expanded metal extending between and joined to said side members of the frame to form an occupant-supporting area, said expanded metal webbing means having ribbons of continuous metal each integrally joined to adjacent ribbons at staggered locations to form an open mesh for progressive energy-absorbing yielding of said webbing means by initial shearing at said integral junctions and then tension elongation of said ribbons upon extreme relative acceleration forces between the occupant and seat for allowing displacement of the occupant relative to said frame, and a semi-rigid sheet element contoured and sized to engage said webbing means for supporting an occupant thereon and distributing forces between the occupant and the webbing means.

(References on following page)

References Cited by the Examiner

UNITED STATES PATENTS

| | | | |
|---|---|---|---|
| 2,459,843 | 1/49 | Scholander | 244—122 |
| 2,577,817 | 12/51 | Schueder et al. | 244—122 |
| 2,702,677 | 2/55 | Replogle | 244—122 |
| 2,755,042 | 7/56 | Paddon | 244—122 |
| 2,845,998 | 8/58 | Estabrook et al. | 297—453 |
| 2,950,885 | 8/60 | Hatfield | 244—141 |
| 2,981,317 | 4/61 | Cartwright | 244—122 |
| 3,020,011 | 2/62 | Beem et al. | 244—41 |
| 3,027,126 | 3/62 | Wallace | 244—141 |

FERGUS S. MIDDLETON, *Primary Examiner.*